(12) United States Patent
Park et al.

(10) Patent No.: US 12,008,769 B2
(45) Date of Patent: Jun. 11, 2024

(54) IMAGE PROCESSING APPARATUS AND OPERATING METHOD THEREOF

(71) Applicant: SAMSUNG ELECTRONICS CO., LTD., Suwon-si (KR)

(72) Inventors: Dubok Park, Suwon-si (KR); Kwanghyun Won, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 468 days.

(21) Appl. No.: 17/294,000

(22) PCT Filed: Nov. 11, 2019

(86) PCT No.: PCT/KR2019/015242
§ 371 (c)(1),
(2) Date: May 14, 2021

(87) PCT Pub. No.: WO2020/101300
PCT Pub. Date: May 22, 2020

(65) Prior Publication Data
US 2022/0012897 A1   Jan. 13, 2022

(30) Foreign Application Priority Data

Nov. 16, 2018   (KR) .................. 10-2018-0141953

(51) Int. Cl.
*G06T 7/20*   (2017.01)
*G06T 3/40*   (2006.01)
*G06T 7/00*   (2017.01)

(52) U.S. Cl.
CPC .................. *G06T 7/20* (2013.01); *G06T 3/40* (2013.01); *G06T 7/97* (2017.01)

(58) Field of Classification Search
CPC .. G06T 7/20; G06T 7/07; G06T 7/223; G06T 7/269; G06T 3/40; H04N 5/14;
(Continued)

(56) References Cited

U.S. PATENT DOCUMENTS 5,917,549 A  *  6/1999  Simons ..................... G06T 3/40
                                          348/E7.003
8,891,009 B2    11/2014  Lu et al.
(Continued)

FOREIGN PATENT DOCUMENTS

JP       2017-207696 A      11/2017
KR   10-2013-0023644 A       3/2013
(Continued)

OTHER PUBLICATIONS

Communication dated Mar. 2, 2020, issued by the International Searching Authority in counterpart International Application No. PCT/KR2019/015242 (PCT/ISA/220, 210, 237).
(Continued)

*Primary Examiner* — Edward F Urban
*Assistant Examiner* — Wassim Mahrouka
(74) *Attorney, Agent, or Firm* — Sughrue Mion, PLLC

(57) ABSTRACT

Provided is an image processing apparatus including a memory storing one or more instructions, and a processor executing the one or more instructions stored in the memory, wherein the processor retargets a current frame image, based on a first scale factor for a previous frame image, a second
(Continued)

scale factor for the current frame image, and a weight determined based on previous frame image data and current frame image data.

11 Claims, 13 Drawing Sheets

(58) Field of Classification Search
CPC ............... H04N 5/144; H04N 21/4402; H04N 21/44029; H04N 21/440263; H04N 21/440281
See application file for complete search history.

(56) References Cited

U.S. PATENT DOCUMENTS

| | | | |
|---|---|---|---|
| 9,055,177 | B2 | 6/2015 | Huang et al. |
| 2009/0190846 | A1* | 7/2009 | Mevissen ................. G06T 7/20 382/236 |
| 2013/0051471 | A1 | 2/2013 | Ahn et al. |
| 2013/0342758 | A1 | 12/2013 | Greisen et al. |
| 2014/0313374 | A1 | 10/2014 | Gao et al. |
| 2018/0254065 | A1* | 9/2018 | Chen ....................... G11B 27/34 |

FOREIGN PATENT DOCUMENTS

| | | |
|---|---|---|
| KR | 10-2016-0139898 A | 12/2016 |
| KR | 10-2016-0141201 A | 12/2016 |
| KR | 10-2018-0014616 A | 2/2018 |

OTHER PUBLICATIONS

Avidan et al., "Seam Carving for Content-Aware Image Resizing," 2007, Total 9 pages.

Greisen et al., "Algorithm and VLSI Architecture for Real-Time 1080p60 Video Retargeting," The Eurographics Association, High Performance Graphics, 2012, Total 10 pages.

Furuta et al., "Fast Volume Seam Carving With Multipass Dynamic Programming," IEEE Transactions on Circuits and Systems for Video Technology, vol. 28, No. 5, May 2018, pp. 1087-1101.

Kim et al., "Image and Video Retargeting Using Adaptive Scaling Function," EURASIP, 17th European Signal Processing Conference (EUSIPCO 2009), Aug. 24-28, 2009, pp. 819-823.

Communication dated Sep. 4, 2023 by the Korean Intellectual Property Office in counterpart Korean Patent Application No. 10-2018-0141953.

* cited by examiner

IMAGE PROCESSING APPARATUS AND OPERATING METHOD THEREOF

TECHNICAL FIELD

The disclosure relates to an image processing apparatus for retargeting an image, and a method of operating the same, and more particularly, to an image processing apparatus capable of reducing jitter in video retargeting, and a method of operating the same.

BACKGROUND ART

Currently, image data may be easily transmitted due to the development of Internet of things (IoT) technology, and be output from various display devices having various aspect ratios. In this case, when an aspect ratio of an original image or an aspect ratio of a display device for outputting image data changes, an object included in the image data may be distorted and thus an unnatural image may be output.

For example, when the original image is transformed to the aspect ratio of the display device by inserting black bars into upper and lower areas or left and right areas of the original image (i.e., letterboxing) or by linearly enlarging or reducing the original image (i.e., linear scaling), image distortion may occur.

Therefore, a method of selectively retargeting an image according to saliency of an object or a background included in the image is required. Meanwhile, in video retargeting, different low-saliency areas may be determined for a plurality of frames included in a video. In this case, an area, data of which is removed or inserted, may differ per frame, and video jitter may occur.

DESCRIPTION OF EMBODIMENTS

Technical Problem

Provided are an image processing apparatus capable of reducing jitter by adaptively retargeting a current frame image, based on motion information of an object and a scale factor variance, and a method of operating the same.

Advantageous Effects of Disclosure

An image processing apparatus according to an embodiment may perform video retargeting in real time and reduce jitter during video reproduction.

When a scale factor varies in an instant due to noise in an image or an abrupt change in illuminance, the image processing apparatus according to an embodiment may reduce jitter by adaptively adjusting the variation.

When motion of a background or an object of an image occurs, the image processing apparatus according to an embodiment may reduce jitter by constantly maintaining a size or a proportion of the object.

The image processing apparatus according to an embodiment may generate images having various aspect ratios without distorting a background or an object included in an original image.

BEST MODE

Figure 1:
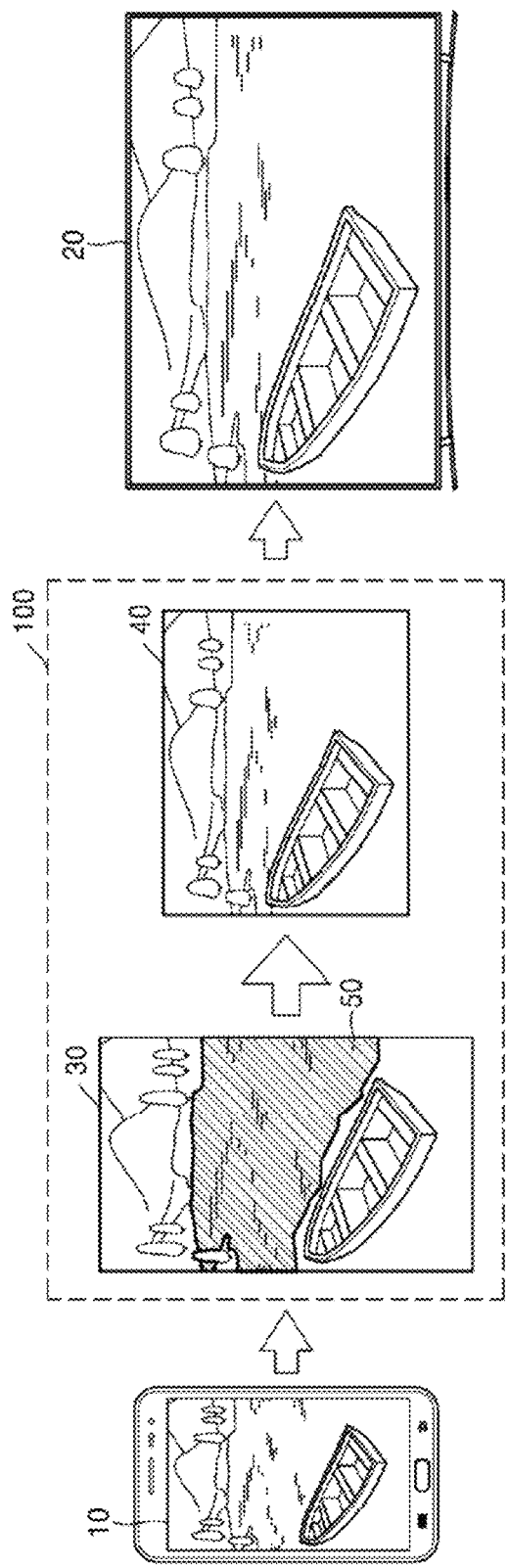
FIG. 1 is a diagram for describing a method, performed by an image processing apparatus, of retargeting an image, according to an embodiment.

According to an embodiment, an image processing apparatus includes a memory storing one or more instructions, and a processor executing the one or more instructions stored in the memory, wherein the processor retargets a current frame image, based on a first scale factor for a previous frame image, a second scale factor for the current frame image, and a weight determined based on previous frame image data and current frame image data.

The processor may analyze motion information of an object in the current frame image, based on the previous frame image and the current frame image, and determine the weight, based on the motion information.

The processor may determine the weight, based on the motion information, to increase a ratio of reflecting the second scale factor to the retargeted frame image when motion of the object is large, or determine the weight to reduce the ratio of reflecting the second scale factor to the retargeted frame image when motion of the object is small.

The processor may determine the weight, based on a variance between the first and second scale factors.

The processor may determine the weight to reduce a ratio of reflecting the second scale factor to the retargeted frame image when the variance between the first and second scale factors is large, or determine the weight to increase the ratio of reflecting the second scale factor to the retargeted frame image when the variance between the first and second scale factors is small.

The processor may differently set the weight depending on a position of pixels, to which the weight is applied, in the current frame image.

The processor may determine the first scale factor corresponding to a first area included in the previous frame image, based on saliency of the first area, and determine the second scale factor corresponding to a second area included in the current frame image, based on saliency of the second area.

The processor may determine the first scale factor corresponding to the first area, to be a large value when the saliency of the first area is large, and determine the second scale factor corresponding to the second area, to be a large value when the saliency of the second area is large.

The processor may determine a third scale factor for the current frame image by using the first scale factor, the second scale factor, and the weight, and retarget the current frame image by applying the third scale factor to the current frame image.

The weight may represent a ratio of reflecting the second scale factor to the third scale factor.

The processor may output the retargeted frame image, and an aspect ratio of the output frame image may differ from an aspect ratio of the current frame image.

According to an embodiment, a method of operating an image processing apparatus includes determining a first scale factor for a previous frame image, and a second scale factor for a current frame image, determining a weight, based on previous frame image data and current frame image data, and retargeting the current frame image, based on the first scale factor, the second scale factor, and the weight.

According to an embodiment, a computer program product includes one or more computer-readable recording media having recorded thereon a program for determining a first scale factor for a previous frame image, and a second scale factor for a current frame image, determining a weight, based on previous frame image data and current frame image data, and retargeting the current frame image, based on the first scale factor, the second scale factor, and the weight.

MODE OF DISCLOSURE

Terminology used in this specification will now be briefly described before describing the disclosure in detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in that case, the meanings of these terms may be described in relevant parts of the disclosure. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, parts not related to the disclosure are not illustrated for clarity of explanation, and like reference numerals denote like elements throughout.

FIG. 1 is a diagram for describing a method, performed by an image processing apparatus 100, of retargeting an image, according to an embodiment.

Referring to FIG. 1, a first image 30 may be an image having a first aspect ratio (e.g., 18.5:9) and being appropriate to be displayed on a display of a first device 10. The first image 30 needs to be retargeted in order to be displayed on a display of a second device 20 having an aspect ratio different from that of the display of the first device 10.

The image processing apparatus 100 according to an embodiment may generate a second image 40 by retargeting the first image 30. In this case, when the image processing apparatus 100 linearly scales a width or height of the first image 30 according to the aspect ratio of the display of the second device 20, an object included in the first image 30 may be distorted.

Therefore, the image processing apparatus 100 according to an embodiment may determine saliency of an object or a background included in the first image 30, by analyzing the first image 30, and retarget the first image 30 by removing or inserting data of a low-saliency area.

For example, as illustrated in FIG. 1, the image processing apparatus 100 may determine the background of the first image 30 as a low-saliency area 50, and reduce the height of the first image 30 by removing a part of data of the background. As such, the image processing apparatus 100 may generate the second image 40 having a second aspect ratio (e.g., 16:9). The second image 40 may be an image appropriate to be displayed on the display of the second device 20.

As described above, the image processing apparatus 100 according to an embodiment may perform image retargeting to generate images naturally transformed to different aspect ratios without distorting a background or an object included in an original image. The transformed images may be provided to devices having different aspect ratios.

Meanwhile, when the image processing apparatus 100 according to an embodiment performs video retargeting, different low-saliency areas may be determined for a plurality of frames included in a video. In this case, an area, data of which is removed or inserted, may differ per frame, and video jitter may occur.

Therefore, in video retargeting, the image processing apparatus 100 according to an embodiment may reduce jitter, based on previous frame image data and current frame image data.

Figure 2:
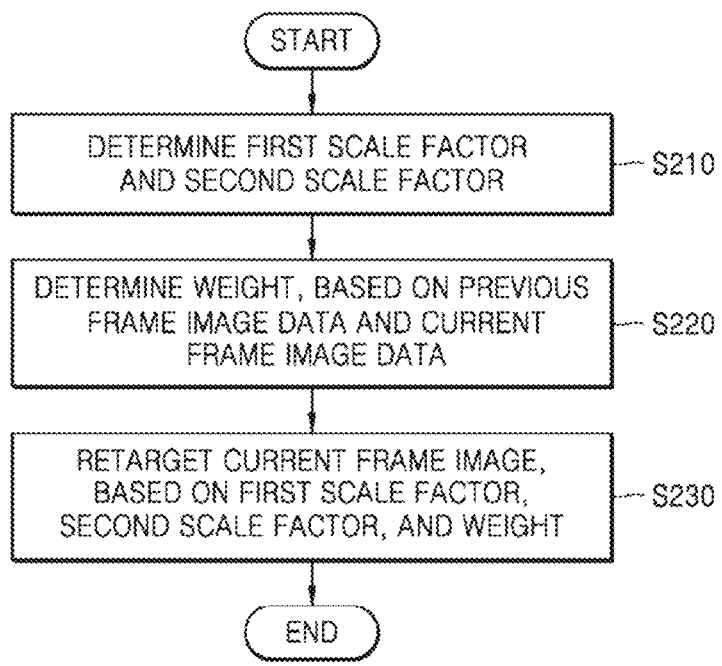
FIG. 2 is a flowchart of a method, performed by an image processing apparatus, of retargeting an image, according to an embodiment.

FIG. 2 is a flowchart of a method, performed by the image processing apparatus 100, of retargeting an image, according to an embodiment.

Referring to FIG. 2, the image processing apparatus 100 may determine a first scale factor of a previous frame image and a second scale factor of a current frame image (S210).

The image processing apparatus 100 may determine the first scale factor, based on saliency information of pixels included in the previous frame image. For example, the image processing apparatus 100 may generate a first saliency map representing saliency of pixels included in the previous frame image $I_{t-k}$, as pixel values, based on previous frame image data. In this case, the first saliency map may be an image representing 'noticeability' in the previous frame image. As such, when a user views the previous frame image, an area mainly viewed or an area of interest may have large pixel values in the first saliency map. The image processing apparatus 100 may determine the first scale factor $S'_{t-k}$, based on the generated first saliency map.

The image processing apparatus 100 may generate a second saliency map of the current frame image $I_t$ in the same manner as the method of generating the first saliency map, and determine the second scale factor $S_t$, based on the second saliency map, in the same manner as the method of determining the first scale factor $S'_{t-k}$.

The image processing apparatus 100 according to an embodiment may determine a weight, based on the previous frame image data and current frame image data (S220).

The image processing apparatus 100 may analyze motion information of an object included in the current frame image, based on the previous frame image and the current frame image. The image processing apparatus 100 may determine the weight w, based on the motion information.

For example, the image processing apparatus 100 may determine the weight w to be increased or reduced in proportion to motion of the object. However, the method of determining the weight is not limited thereto.

The image processing apparatus 100 may determine the weight, based on a variance between the first and second scale factors. For example, the image processing apparatus 100 may determine the weight to be reduced or increased in inverse proportion to the variance between the first and second scale factors. However, the method of determining the weight is not limited thereto.

The image processing apparatus 100 may retarget the current frame image, based on the first scale factor, the second scale factor, and the weight (S230).

For example, the image processing apparatus 100 may calculate a third scale factor as a weighted sum of the first and second scale factors, and the third scale factor may be represented by Equation 1.

$$S'_t(x) = (1-w(x)) \cdot S'_{t-k}(x) + w(x) \cdot S_t(x) \quad \text{[Equation 1]}$$

$S'_t(x)$ denotes the third scale factor, $w(x)$ denotes the weight determined in operation S220, $S'_{t-k}(x)$ denotes the first scale factor, and $S_t(x)$ denotes the second scale factor. A ratio of reflecting the second scale factor to the retargeted frame image is increased in proportion to the value of the weight $w(x)$, and a ratio of reflecting the first scale factor to the retargeted frame image is increased in inverse proportion to the value of the weight w.

The image processing apparatus 100 may generate the retargeted frame image by applying, to the current frame image $I_t(x,y)$, the third scale factor calculated as shown in Equation 1.

Figure 3:
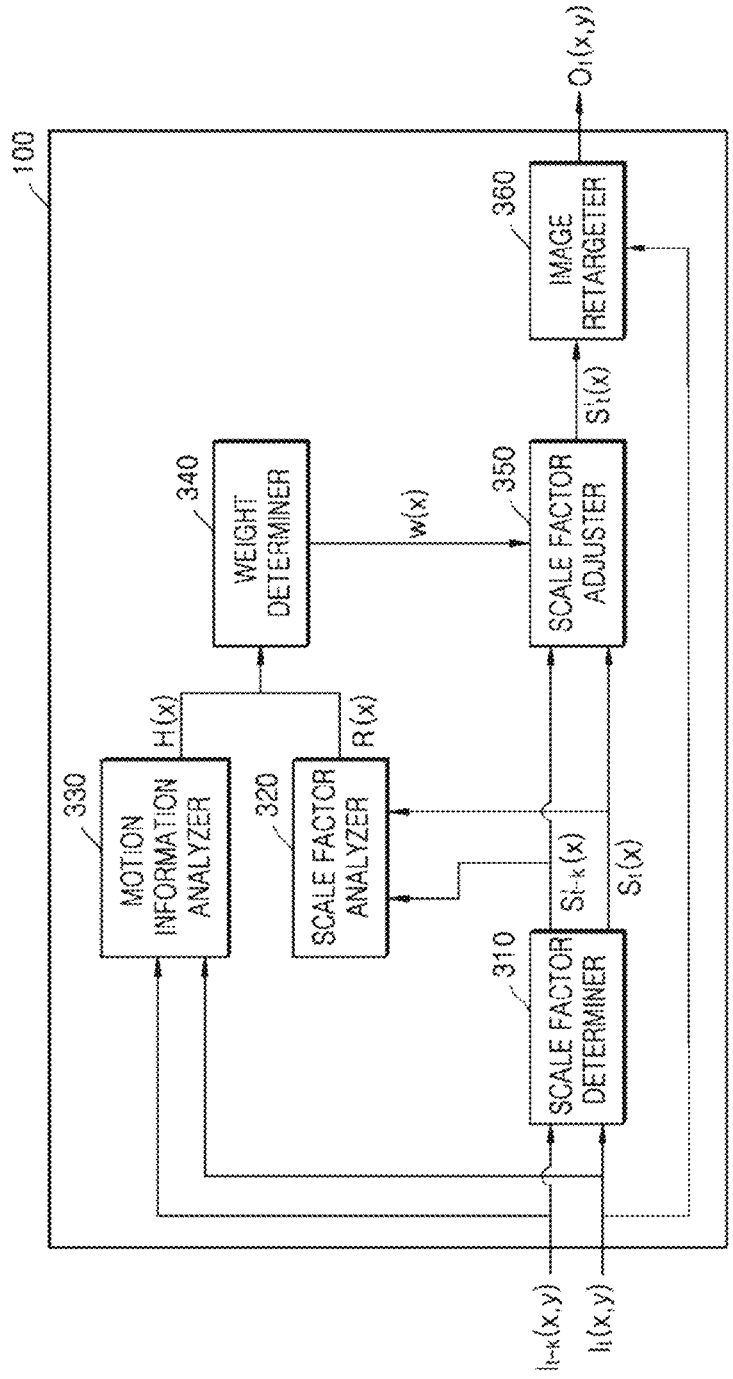
FIG. 3 is a reference diagram for describing a method, performed by an image processing apparatus, of retargeting an image, according to an embodiment.

FIG. 3 is a reference diagram for describing a method, performed by the image processing apparatus 100, of retargeting an image, according to an embodiment.

Referring to FIG. 3, the image processing apparatus 100 may include a scale factor determiner 310, a scale factor analyzer 320, a motion information analyzer 330, a weight determiner 340, a scale factor adjuster 350, and an image retargeter 360.

The scale factor determiner 310 may determine a first scale factor $S'_{t-k}$ of a previous frame image $I_{t-k}$. For example, the scale factor determiner 310 may generate a first saliency map representing saliency in the previous frame image, based on previous frame image data. The scale factor determiner 310 may extract a color map, an intensity map, an orientation map, etc. corresponding to the previous frame image, based on feature information of the previous frame image, and generate the first saliency map for the previous frame image, based on the extracted maps. In this case, the first saliency map may be an image representing 'noticeability' in the previous frame image. As such, when a user views the previous frame image, an area mainly viewed or an area of interest may have large pixel values in the first saliency map. However, the first saliency map is not limited thereto. The scale factor determiner 310 may generate the first saliency map by using a neural network, but is not limited thereto.

The scale factor determiner 310 may determine the first scale factor $S'_{t-k}$, based on the first saliency map. For example, the scale factor determiner 310 may determine a sum of pixel values at the same x coordinate in the first saliency map, as the first scale factor corresponding to the x coordinate. Alternatively, the image processing apparatus 100 may determine an average, maximum, minimum, or the like of pixel values at the same x coordinate in the first saliency map, as the first scale factor corresponding to the x coordinate. As such, the first scale factor $S'_{t-k}$ may be represented as a function having an x coordinate of pixels as a parameter. However, the first scale factor is not limited thereto.

The scale factor determiner 310 may determine a second scale factor $S_t$ of a current frame image $I_t$. The scale factor determiner 310 may determine the second scale factor $S_t$ in the same manner as the method of determining the first scale factor $S'_{t-k}$. The scale factor determiner 310 may generate a second saliency map representing saliency in the current frame image, based on current frame image data, and determine the second scale factor, based on the second saliency map. Meanwhile, because the method of determining the first scale factor $S'_{t-k}$ is described in detail above, a detailed description of the method of determining the second scale factor $S_t$ is not provided herein.

The scale factor analyzer 320 may analyze a variance between the first and second scale factors, and the weight determiner 340 may determine a weight, based on the variance R(x) between the first and second scale factors. A detailed description thereof will now be provided with reference to FIG. 4.

Figure 4:
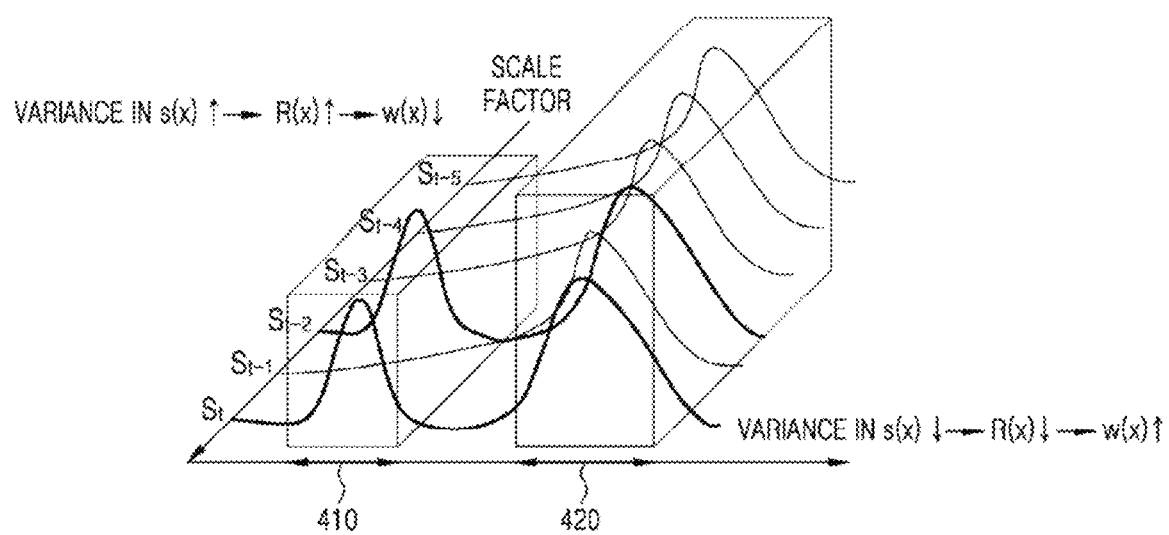
FIG. 4 is a diagram showing that a scale factor according to an embodiment varies over time.

FIG. 4 is a diagram showing that a scale factor according to an embodiment varies over time.

The scale factor analyzer 320 according to an embodiment may calculate a variance parameter R(x) based on a scale factor variance.

Referring to FIG. 4, a scale factor for a current frame image may vary when the current frame image changes over time, and the scale factor analyzer 320 may calculate a variance between scale factors corresponding to previous frame images and the scale factor corresponding to the current frame image, whenever the current frame image changes.

The scale factor analyzer 320 may calculate the variance between the scale factors for the previous frame images and the current frame image by using the scale factor corresponding to the current frame image and a variance between the scale factors for the previous frame images. Therefore, the scale factor analyzer 320 may update the value of the variance parameter R(x), based on the scale factor of the current frame image whenever the current frame image changes.

For example, the scale factor variance R(x) is increased or reduced in proportion to a variance in a scale factor s(x).

The weight determiner 340 may determine a weight w(x) according to an embodiment, in consideration of the variance parameter R(x). For example, the weight determiner 340 may reduce jitter by reducing a weight for the scale factor of the current frame image (i.e., a second scale factor) when the scale factor variance is large (for example, when the scale factor varies in an instant due to a noise signal in the frame image or a change in illuminance), and increasing the weight for the scale factor of the current frame image when the scale factor variance is small.

For example, the weight determiner 340 may determine the weight w(x) for the scale factor of the current frame image (i.e., the second scale factor) to be a small value in a first area 410 of FIG. 4, or determine the weight w(x) for the second scale factor to be a large value in a second area 420.

Referring back to FIG. 3, the motion information analyzer 330 may analyze motion information of an object included in the current frame image, based on the previous frame image and the current frame image. The weight determiner 340 may reduce jitter by determining the weight, based on the motion information of the object.

A detailed description thereof will now be provided with reference to FIGS. 5 to 8.

Figure 5:
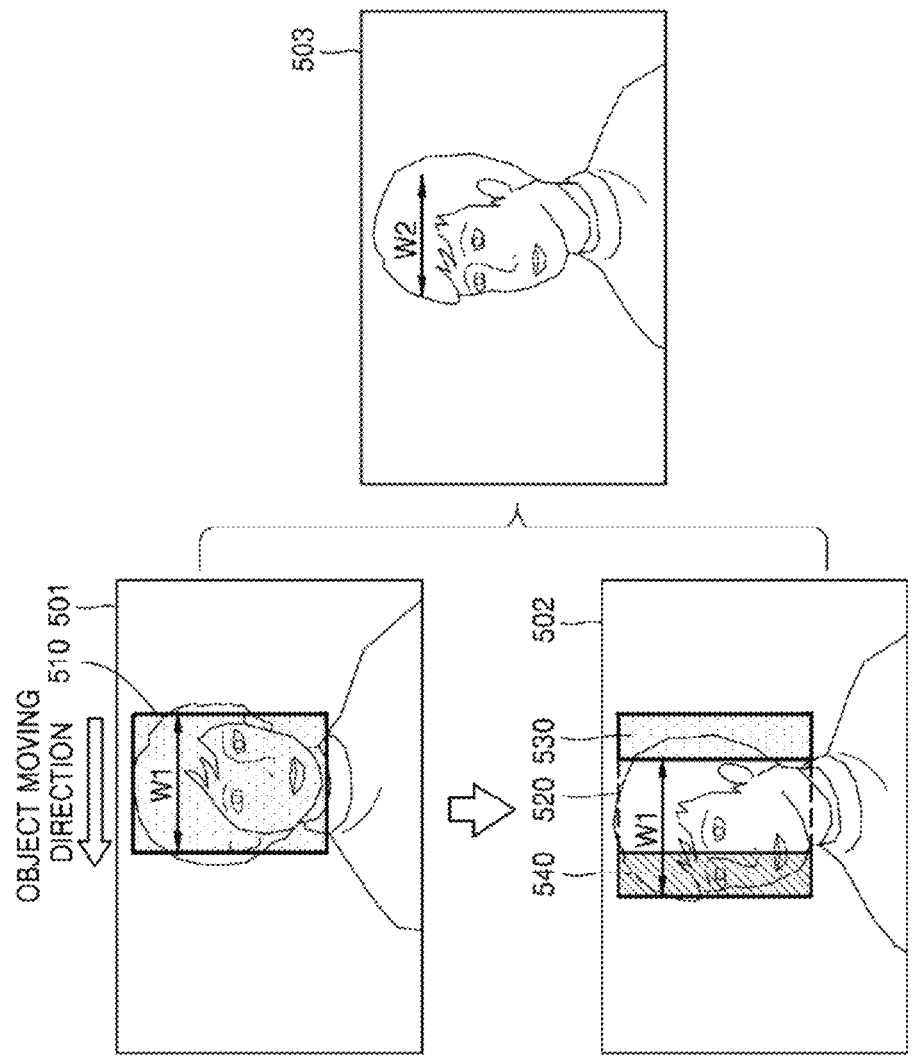
FIG. 5 is a diagram showing that jitter occurs due to motion of an object.

FIG. 5 is a diagram showing that jitter occurs due to motion of an object.

Referring to FIG. 5, an object included in an image may be positioned in a first area 510 of a previous frame image 501. The object may move leftward over time and be positioned in a second area 520 of a current frame image 502. In this case, a third scale factor for retargeting the current frame image may be calculated by applying a weight w to the first and second scale factors. In this case, when the same weight w is applied to all frame images, the third scale factor may not reflect motion of the object and thus jitter may occur during video reproduction.

For example, the first scale factor may have a large value in the first area 510 where the object is positioned, and the second scale factor may have a large value in the second area 520 where the object is positioned. When the third scale factor is calculated by applying the same weight to the first and second areas 510 and 520, the third scale factor for a third area 530 (e.g., a partial area of the first area 510 where the object is not positioned in the current frame image 502) may be calculated as a value larger than the second scale factor, due to the influence of the first scale factor having a large value. The third scale factor corresponding to a fourth area 540 (e.g., a partial area of the second area 520 where the object is not positioned in the previous frame image 501) may be calculated as a value smaller than the second scale factor, due to the influence of the first scale factor having a small value.

As such, when image retargeting is performed by applying the third scale factor to the current frame image, data of the third area 530 (i.e., an area where the object is not positioned) may be enhanced to magnify a background, and data of the fourth area 540 (i.e., an area where the object is positioned) may be reduced to reduce an object size.

As illustrated in FIG. 5, when the previous frame image 501, the current frame image 502, and a frame image 503 retargeted using the third scale factor are compared, an object size W2 in the retargeted frame image 503 may be reduced compared to an object size W1 in the previous and current frame images 501 and 502. Because the object size in the retargeted current frame image is reduced, jitter may occur during video reproduction. Therefore, the image processing apparatus 100 according to an embodiment needs to determine the weight in consideration of motion information of the object in order to retarget the current frame image by reflecting motion of the object.

Figure 6:
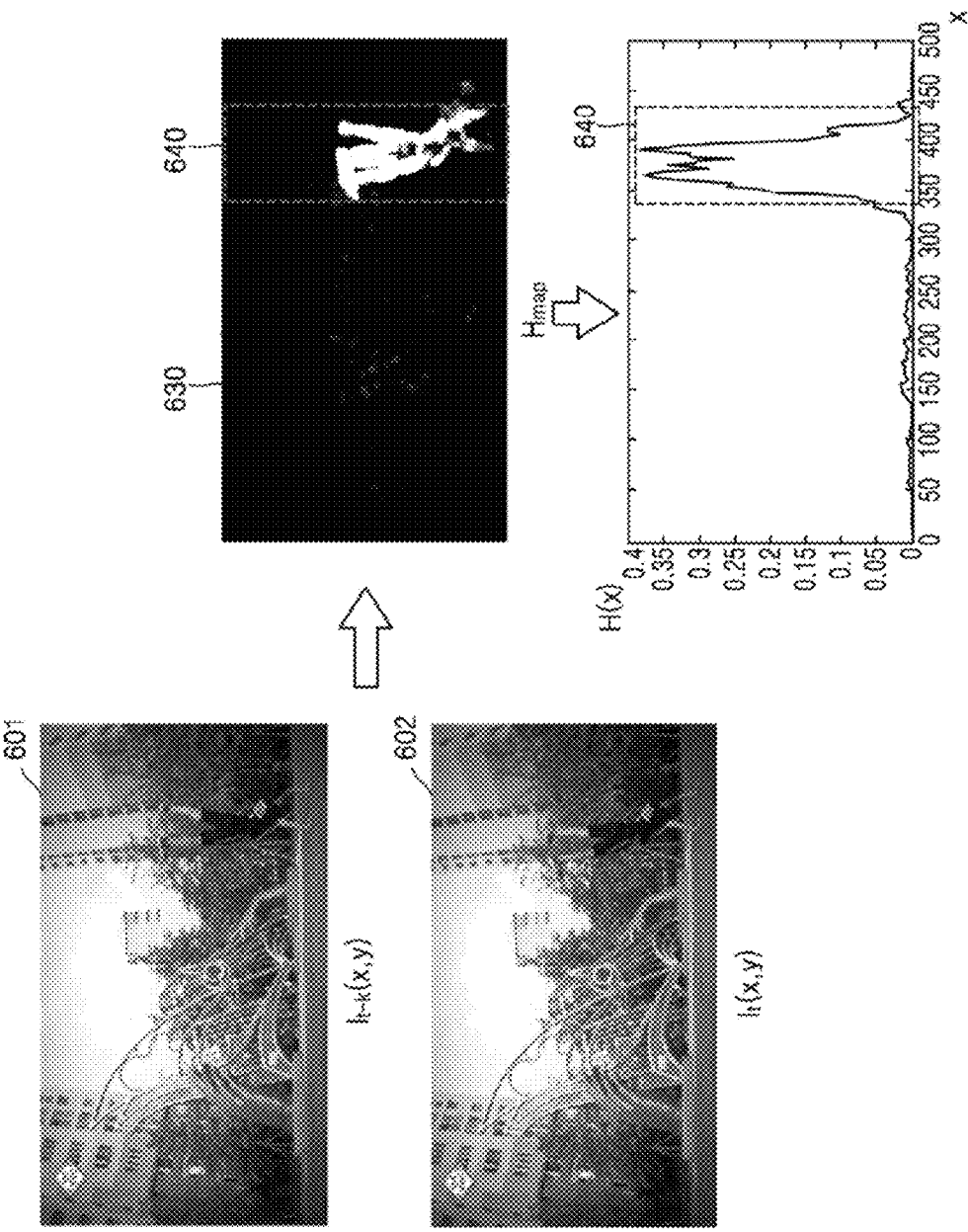
FIGS. 6 and 7 are reference diagrams for describing a method, performed by an image processing apparatus, of determining a weight, based on motion information of an object, according to an embodiment.
Figure 7:
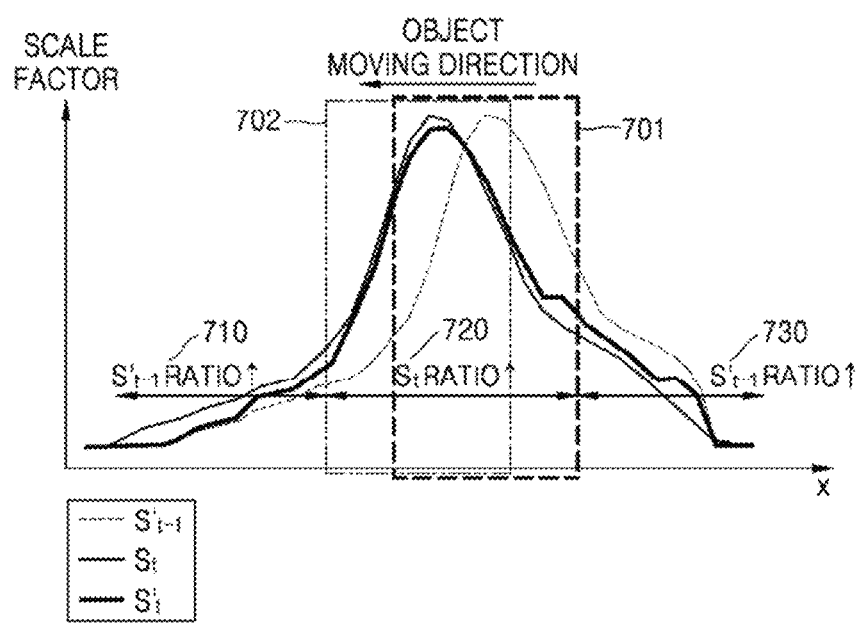

FIGS. 6 and 7 are reference diagrams for describing a method, performed by the image processing apparatus 100, of determining a weight, based on motion information of an object, according to an embodiment.

Referring to FIG. 6, the motion information analyzer 330 may estimate motion based on pixel value differences per patch, by using a previous frame image 601 and a current frame image 602. For example, the motion information analyzer 330 may calculate a motion map $H_{map}$ 630 shown in FIG. 6, by using Equation 2.

$$H_{map}(x, y) = 1 - \exp\left\{-\frac{\sum_{(m,n) \in P}(I_t(m, n) - I_{t-k}(m, n))^2}{\sigma_w^2}\right\} \quad \text{[Equation 2]}$$

In this case, $I_t(m,n)$ denotes a pixel value at an (m,n) position of the current frame image, $I_{t-k}$ denotes a pixel value at the (m,n) position of the previous frame image, P denotes a patch based on (x, y) coordinates, and $\sigma_w^2$ denotes an adjustable parameter. For example, even a small motion may be reflected to $H_{map}$ when $\sigma_w^2$ has a small value, and a small motion may not be reflected and only a large motion may be reflected to $H_{map}$ when $\sigma_w^2$ has a large value.

Meanwhile, although only a method of calculating a motion map based on pixel value differences per patch is described in relation to FIG. 6, a method of estimating motion of an object is not limited thereto. The motion information analyzer 330 according to an embodiment may estimate motion of an object by using various methods of estimating motion of an object included in an image. For example, the motion information analyzer 330 may estimate motion of an object based on an optical flow of an image by analyzing the optical flow, or estimate motion by using a method of estimating motion based on pixel value differences per block.

According to an embodiment, the motion information analyzer 330 may calculate motion information H(x) of FIG. 6, based on the estimated motion (e.g., the motion map), and the motion information H(x) may be represented by Equation 3.

$$H(x) = \left[\frac{1}{N}\sum_y H_{map}(x, y)\right]^2 \quad \text{[Equation 3]}$$

Herein, N denotes the number of rows of pixels included in the image, and $H_{map}(x,y)$ denotes a value of an (x,y) coordinate in the motion map calculated using Equation 2. Referring to FIG. 6, the motion information H(x) may have a large value in an area 640 where motion occurs.

FIG. 7 is a reference diagram for describing a method, performed by the image processing apparatus 100, of determining a weight w(x), based on H(x), according to an embodiment.

Referring to FIG. 7, an object positioned in a first area 701 of a previous frame image may move leftward and be positioned in a second area 702 of a current frame image. In this case, the weight determiner 340 may determine the weight to increase a ratio of reflecting a second scale factor $S_t$ in an area 720 where motion occurs, in order to reflect the position of the object in the current frame image. The weight determiner 340 may determine the weight to increase a ratio of reflecting a first scale factor $S'_{t-k}$ in areas 710 and 730 where motion does not occur.

Therefore, the weight determiner 340 may determine a large weight w(x) to be applied to the second scale factor $S_t$, when the motion information H(x) has a large value (e.g., when motion of the object is large), or determine a small weight w(x) to be applied to the second scale factor $S_t$, when the motion information H(x) has a small value (e.g., when motion of the object is small).

Figure 8:
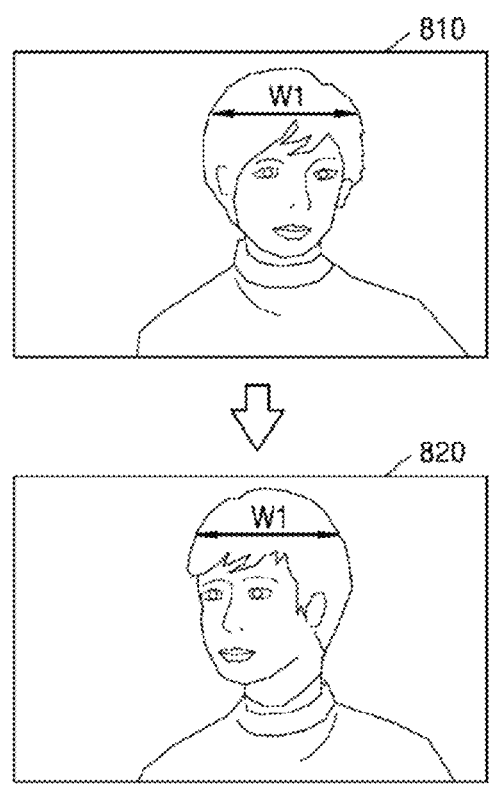
FIG. 8 is a diagram showing an example in which a weight determined based on motion information is applied, according to an embodiment.

FIG. 8 is a diagram showing an example in which a weight determined based on motion information is applied, according to an embodiment.

FIG. 8 shows a retargeted previous frame image 810 and a retargeted current frame image 820. When the retargeted current frame image 820 of FIG. 8 and the retargeted current frame image 503 of FIG. 5 are compared, it is shown that a size or a proportion of an object does not greatly change in the current frame image 820 of FIG. 8. Therefore, even when motion of the object occurs, an image retargeting method according to an embodiment may prevent a change in size or proportion of the object included in the retargeted current frame image 820, thereby reducing jitter.

Meanwhile, referring back to FIG. 3, the weight determiner 340 may determine the weight, based on the motion information H(x)) and the scale factor variance R(x) as described above. For example, the weight determiner 340 may determine the weight to reduce a ratio of reflecting the second scale factor (i.e., a scale factor of the current frame image) to the retargeted frame image when the scale factor variance R(x) is large, or determine the weight to increase the ratio of reflecting the second scale factor to the retargeted frame image when the scale factor variance R(x) is small.

The weight determiner 340 may determine the weight to increase the ratio of reflecting the second scale factor to the retargeted frame image when motion of the object is large, or determine the weight to reduce the ratio of reflecting the second scale factor to the retargeted frame image when motion of the object is small.

For example, the weight determiner 340 may update the weight w(x) through recursive filtering based on the Kalman filter. Two equations shown below are required to use the Kalman filter, and thus the weight determiner 340 may model a processing equation (e.g., Equation 4) and a measurement equation (e.g., Equation 5).

$$\text{Processing modeling: } S_t(x) = S_{t-k}(x) + n_{t-1}, n \sim (0, Q) \quad \text{[Equation 4]}$$

$$\text{Measurement modeling: } Z_t(x) = S_t(x) + v_t, v \sim (0, R) \quad \text{[Equation 5]}$$

The weight determiner 340 may predict and update the scale factor and the scale factor variance by using the modeled equations and Equation 6.

$$\text{Prediction:} \begin{cases} \tilde{S}_t(x) = S'_{t-k}(x) \\ \tilde{P}_t(x) = \hat{P}_{t-k}(x) + H(x)Q(x) \end{cases} \quad \text{[Equation 6]}$$

$$\text{update:} \begin{cases} S'_t(x) = \tilde{S}_t(x) + K_t(x)(Z_t(x) - \tilde{S}_t(x)) \\ \hat{P}_t(x) = (1 - K_t(x))\tilde{P}_t(x) \end{cases}$$

Using Equation 6, a third scale factor for retargeting the current frame image may be represented by Equation 7.

$$S'_t(x) = \left[1 - \frac{\hat{P}_{t-k}(x) + H(x)Q(x)}{\hat{P}_{t-k}(x) + H(x)Q(x) + R(x)}\right] S'_{t-k}(x) + \quad \text{[Equation 7]}$$

$$\frac{\hat{P}_{t-k}(x) + H(x)Q(x)}{\hat{P}_{t-k}(x) + H(x)Q(x) + R(x)} S_t(x)$$

Using Equations 1 and 7, the weight w(x) may be represented by Equation 8, and the weight determiner 340 may calculate the weight w(x) by using Equation 8.

$$w(x) = \frac{\hat{P}_{t-k}(x) + H(x)Q(x)}{\hat{P}_{t-k}(x) + H(x)Q(x) + R(x)} \quad \text{[Equation 8]}$$

Figure 9:
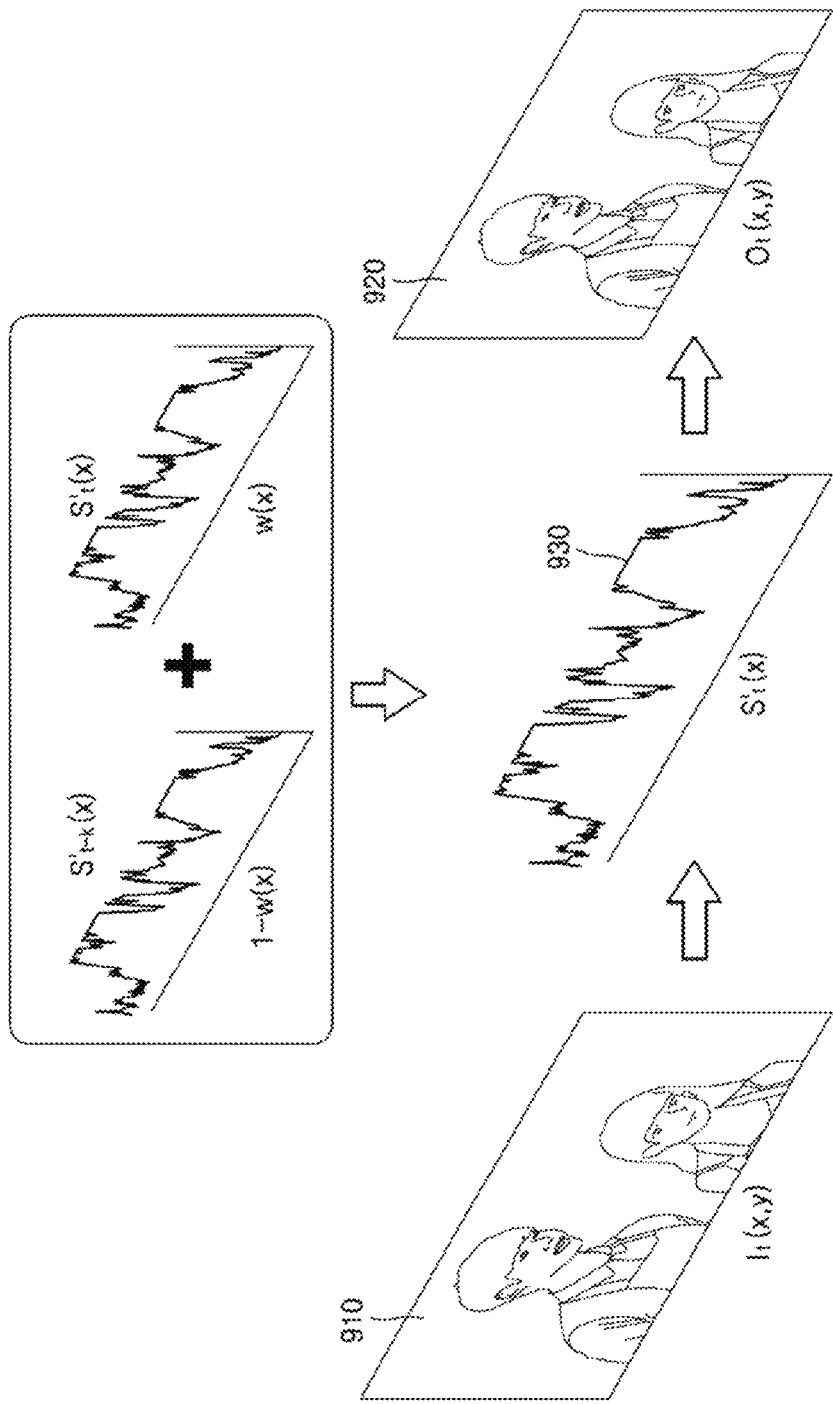
FIG. 9 is a reference diagram for describing a method, performed by an image processing apparatus, of determining a third scale factor, according to an embodiment.

Referring back to FIG. 3, the scale factor adjuster 350 may calculate a third scale factor $S'_t$ 930 as illustrated in FIG. 9, based on the first scale factor $S'_{t-k}$, the second scale factor $S_t$, and the weight w(x) determined by the weight determiner 340. For example, the scale factor adjuster 350 may determine the third scale factor by using Equation 1 or 7.

The image retargeter 360 may retarget the current frame image by applying the third scale factor to the current frame image $I_t$ 910. The image retargeter 360 may output the retargeted current frame image $O_t$ 920.

Figure 10:
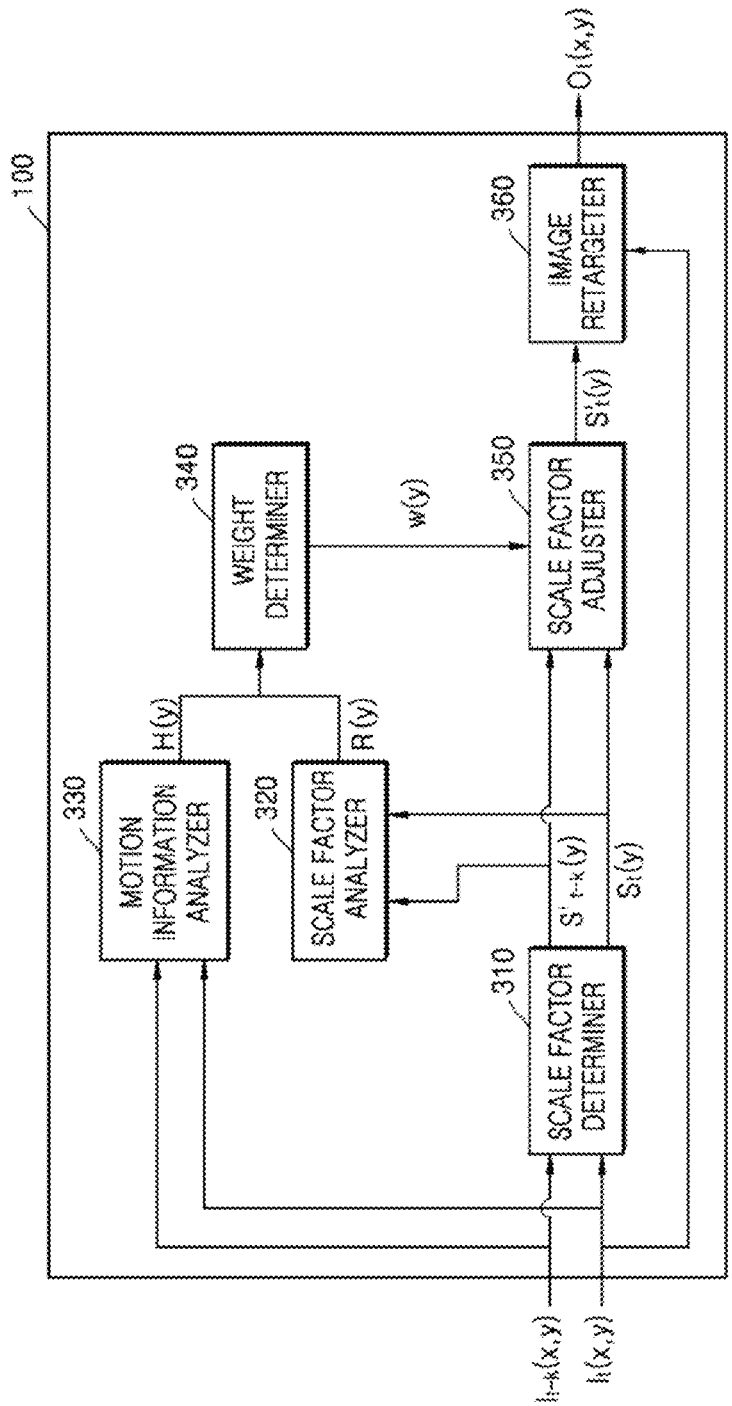
FIG. 10 is a reference diagram for describing a method, performed by an image processing apparatus, of retargeting an image, according to another embodiment.

FIG. 10 is a reference diagram for describing a method, performed by the image processing apparatus 100, of retargeting an image, according to another embodiment.

Although only a method of determining a scale factor and a weight according to an x coordinate of pixels to which the scale factor and the weight are applied is described in relation to FIGS. 3 to 9, the image processing apparatus 100 according to an embodiment may determine a scale factor and a weight according to a y coordinate of pixels to which the scale factor and the weight are applied.

For example, the scale factor determiner 310 may determine a sum, average, maximum, minimum, or the like of pixel values at the same y coordinate in a first saliency map, as a first scale factor corresponding to the y coordinate. In addition, the scale factor determiner 310 may determine a sum, average, maximum, minimum, or the like of pixel values at the same y coordinate in a second saliency map, as a second scale factor corresponding to the y coordinate. As such, the first and second scale factors may be represented as a function having a y coordinate of pixels as a parameter.

The scale factor analyzer 320 may calculate a variance parameter R(y) by equally applying the method described above in relation to FIGS. 3 to 9, on the basis of a y coordinate.

The motion information analyzer 330 may calculate motion information H(y) by equally applying the method described above in relation to FIGS. 3 to 9, on the basis of a y coordinate.

The weight determiner 340 may determine a weight w(y) having a y coordinate as a parameter, based on the variance parameter R(y) and the motion information H(y), and the scale factor adjuster 350 may calculate a third scale factor, based on the first scale factor, the second scale factor, and the weight w(y). In this case, the third scale factor may be represented as a function having a y coordinate as a parameter.

The image retargeter 360 may generate a retargeted current frame image by applying, to the current frame image, the third scale factor having a y coordinate as a parameter.

Figure 11:
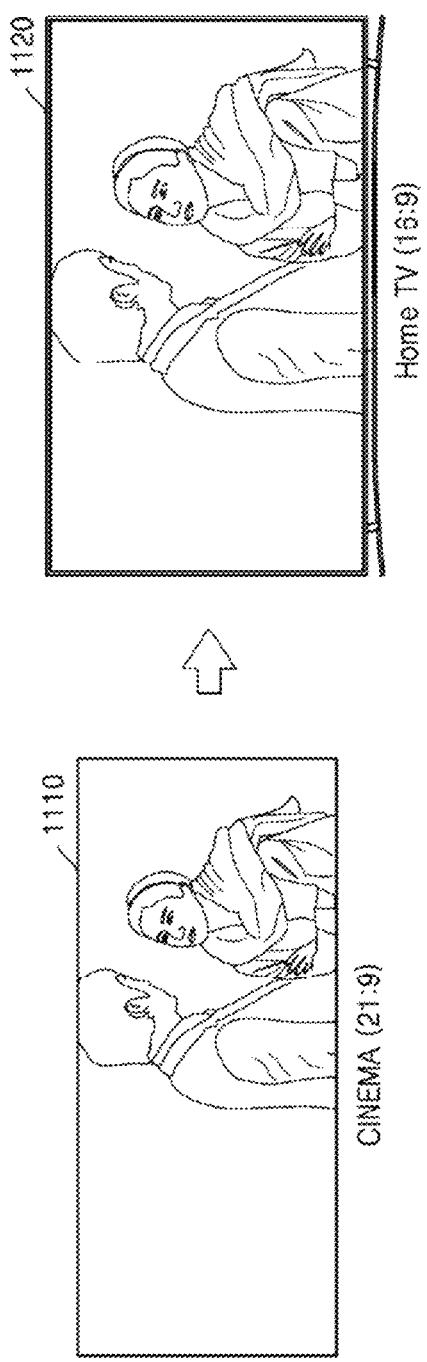
FIGS. 11 and 12 are diagrams showing examples in which an image processing apparatus according to an embodiment retargets an image.
Figure 12:
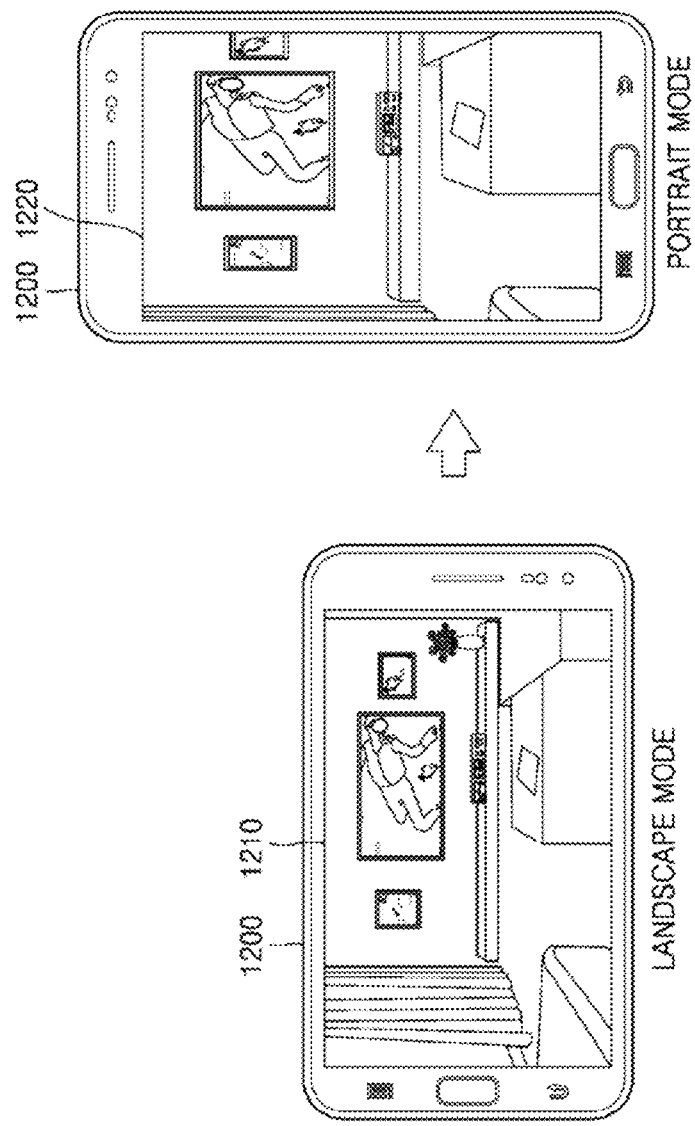

FIGS. 11 and 12 are diagrams showing examples in which the image processing apparatus 100 according to an embodiment retargets an image.

Referring to FIG. 11, a first image 1110 may be an image having a first aspect ratio (e.g., 21:9) and displayed on a first device (e.g., a cinema screen). The image processing apparatus 100 according to an embodiment may generate a second image 1120 by retargeting the first image 1110 by using the method described above in relation to FIGS. 3 to 10. In this case, the second image 1120 may have a second aspect ratio (e.g., 16:9) and be displayed on a second device (e.g., a television (TV)).

Referring to FIG. 12, a third image 1210 may be an image having a third aspect ratio and displayed in a landscape mode of a third device 1200. The image processing apparatus 100 according to an embodiment may generate a fourth image 1220 by retargeting the third image 1210 by using the method described above in relation to FIGS. 3 to 10. In this case, the fourth image 1220 may be an image displayed in a portrait mode of the third device 1200.

The image processing apparatus 100 according to an embodiment may generate an image naturally transformed to a different aspect ratio without distorting a background or an object included in the image, and reduce jitter in video retargeting.

Figure 13:
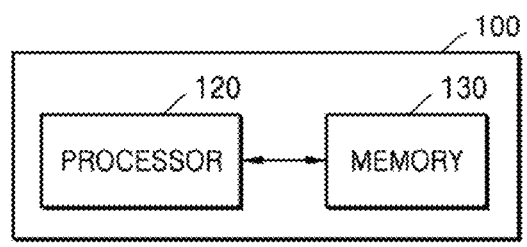
FIG. 13 is a block diagram of an image processing apparatus according to an embodiment.

FIG. 13 is a block diagram of the image processing apparatus 100 according to an embodiment.

Referring to FIG. 13, the image processing apparatus 100 according to an embodiment may include a processor 120 and a memory 130.

The processor 120 according to an embodiment may control overall operations of the image processing apparatus 100. The processor 120 according to an embodiment may execute one or more programs stored in the memory 130.

The memory 130 according to an embodiment may store various types of data, programs, or applications for driving and controlling the image processing apparatus 100. The programs stored in the memory 130 may include one or more instructions. The programs (e.g., one or more instructions) or applications stored in the memory 130 may be executed by the processor 120.

The processor 120 according to an embodiment may include at least one of the scale factor determiner 310, the scale factor analyzer 320, the motion information analyzer 330, the weight determiner 340, the scale factor adjuster 350, and the image retargeter 360 described above in relation to FIGS. 3 to 10.

Meanwhile, at least one of the scale factor determiner 310, the scale factor analyzer 320, the motion information analyzer 330, the weight determiner 340, the scale factor adjuster 350, and the image retargeter 360 may be produced in the form of a chip and be mounted in the image processing apparatus 100. For example, at least one of the scale factor determiner 310, the scale factor analyzer 320, the motion information analyzer 330, the weight determiner 340, the scale factor adjuster 350, and the image retargeter 360 may be produced in the form of a dedicated hardware chip for artificial intelligence (AI) or as a part of a general-purpose processor (e.g., a central processing unit (CPU) or an application processor) or a dedicated graphics processor (e.g., a graphics processing unit (GPU)), and be mounted in various image processing apparatuses.

In this case, the scale factor determiner 310, the scale factor analyzer 320, the motion information analyzer 330, the weight determiner 340, the scale factor adjuster 350, and the image retargeter 360 may be mounted in one image processing apparatus, or be separately mounted in different image processing apparatuses. For example, some of the scale factor determiner 310, the scale factor analyzer 320, the motion information analyzer 330, the weight determiner 340, the scale factor adjuster 350, and the image retargeter 360 may be included in an image processing apparatus, and the others may be included in a server.

At least one of the scale factor determiner 310, the scale factor analyzer 320, the motion information analyzer 330, the weight determiner 340, the scale factor adjuster 350, and the image retargeter 360 may be implemented as a software module. When at least one of the scale factor determiner 310, the scale factor analyzer 320, the motion information analyzer 330, the weight determiner 340, the scale factor adjuster 350, and the image retargeter 360 is implemented as a software module (or a program module including instructions), the software module may be stored in non-transitory computer-readable media. In this case, the at least one software module may be provided by an operating system (OS) or by a certain application. Alternatively, a part of the at least one software module may be provided by an OS and the other part may be provided by a certain application.

Meanwhile, the block diagrams of the image processing apparatus 100 and the processor 120 illustrated in FIGS. 3, 10, and 13 are block diagrams for embodiments. The elements in each block diagram may be integrated, added, or omitted depending on implemented specifications of the image processing apparatus 100. That is, when necessary, two or more elements may be integrated into one element, or one element may be subdivided into two or more elements. In addition, functions performed in blocks are merely to describe embodiments, and specific operations or apparatuses thereof do not limit the scope of the disclosure.

A method of operating an image processing apparatus, according to an embodiment, may be implemented in the form of program commands executable by various computer means and be recorded on a computer-readable recording medium. The computer-readable recording medium may include program commands, data files, data structures, or a combination thereof. The program commands recorded on the medium may be those specially designed and configured for the disclosure, or those known to and usable by one of ordinary skill in the art of computer software. Examples of the computer-readable recording medium include magnetic media (e.g., hard disks, floppy disks, and magnetic tape), optical media (e.g., CD-ROMs and DVDs), magneto-optical media (e.g., floptical disks), and hardware devices (e.g., ROMs, RAMs, and flash memories) that are specially configured to store and execute program commands. Examples of the program commands include both machine code, such as produced by a compiler, and high-level language code that may be executed by the computer using an interpreter.

An image processing apparatus and a method of operating the image processing apparatus, according to the afore-described embodiments, may be included and provided in a computer program product. The computer program product may be traded between a seller and a buyer.

The computer program product may include a software program, and a computer-readable storage medium having the software program stored therein. For example, the computer program product may include a product that is electronically distributed in the form of a software program (e.g., a downloadable application) via an electronic device manufacturer or an electronic market (e.g., Google Play or App Store). For electronic distribution, at least a part of the software program may be stored in a storage medium or be temporarily generated. In this case, the storage medium may be a storage medium of a server of the manufacturer, a server of the electronic market, or a relay server that temporarily stores the software program.

The computer program product may include a storage medium of a server or a storage medium of a client device in a system including the server and the client device. Otherwise, when a third device (e.g., a smartphone) connected and communicating with the server or the client device is present, the computer program product may include a storage medium of the third device. Alternatively, the computer program product may include a software program itself that is transmitted from the server to the client device or the third device, or from the third device to the client device.

In this case, one of the server, the client device, and the third device may execute the computer program product to perform the method according to the afore-described embodiments. Alternatively, two or more of the server, the client device, and the third device may execute the computer program product to perform the method according to the afore-described embodiments in a distributed fashion.

For example, the server (e.g., a cloud server or an AI server) may execute the computer program product stored therein, to control the client device connected and communicating with the server, to perform the method according to the afore-described embodiments.

While the disclosure has been particularly shown and described with reference to embodiments thereof, it will be understood by one of ordinary skill in the art that various changes in form and details may be made therein without departing from the scope of the disclosure as defined by the following claims.

The invention claimed is:

1. An image processing apparatus comprising:
   a memory storing one or more instructions; and
   a processor executing the one or more instructions stored in the memory,
   wherein the processor retargets a current frame image, based on a first scale factor for a previous frame image, a second scale factor for the current frame image, and a weight determined based on previous frame image data and current frame image data,
   wherein the processor analyzes motion information of an object in the current frame image, based on the previous frame image and the current frame image, and determines the weight, based on the motion information, to increase a ratio of reflecting the second scale factor to the retargeted frame image when motion of the object is large, and determines the weight to reduce the ratio of reflecting the second scale factor to the retargeted frame image when motion of the object is small.

2. The image processing apparatus of claim 1, wherein the processor determines the weight, based on a variance between the first and second scale factors.

3. The image processing apparatus of claim 2, wherein the processor determines the weight to reduce a ratio of reflecting the second scale factor to the retargeted frame image when the variance between the first and second scale factors is large, or determines the weight to increase the ratio of reflecting the second scale factor to the retargeted frame image when the variance between the first and second scale factors is small.

4. The image processing apparatus of claim 1, wherein the processor differently sets the weight depending on a position of pixels, to which the weight is applied, in the current frame image.

5. The image processing apparatus of claim 1, wherein the processor determines the first scale factor corresponding to a first area comprised in the previous frame image, based on saliency of the first area, and determines the second scale factor corresponding to a second area comprised in the current frame image, based on saliency of the second area.

6. The image processing apparatus of claim 5, wherein the processor determines the first scale factor corresponding to the first area, to be a large value when the saliency of the first area is large, and determines the second scale factor corresponding to the second area, to be a large value when the saliency of the second area is large.

7. The image processing apparatus of claim 1, wherein the processor determines a third scale factor for the current frame image by using the first scale factor, the second scale factor, and the weight, and retargets the current frame image by applying the third scale factor to the current frame image.

8. The image processing apparatus of claim 7, wherein the weight represents a ratio of reflecting the second scale factor to the third scale factor.

9. The image processing apparatus of claim 1, wherein the processor outputs the retargeted frame image, and
   wherein an aspect ratio of the output frame image differs from an aspect ratio of the current frame image.

10. A method of operating an image processing apparatus, the method comprising:
    determining a first scale factor for a previous frame image, and a second scale factor for a current frame image;
    determining a weight, based on previous frame image data and current frame image data; and
    retargeting the current frame image, based on the first scale factor, the second scale factor, and the weight,
    wherein the determining of the weight comprises:
       analyzing motion information of an object in the current frame image, based on the previous frame image and the current frame image; and
       determining the weight, based on the motion information, to increase a ratio of reflecting the second scale factor to the retargeted frame image when motion of the object is large, and determining the weight to reduce the ratio of reflecting the second scale factor to the retargeted frame image when motion of the object is small.

11. The method of claim 10, wherein the determining of the weight comprises determining the weight, based on a variance between the first and second scale factors.

* * * * *